US008521911B2

United States Patent
Jung et al.

(10) Patent No.: US 8,521,911 B2
(45) Date of Patent: Aug. 27, 2013

(54) APPARATUS, SYSTEM AND METHOD FOR EXECUTING DISCOVERY IN NETWORK

(75) Inventors: Dong-shin Jung, Suwon-si (KR); Won-seok Kwon, Suwon-si (KR); Joo-yeol Lee, Seoul (KR); Seung-jae Oh, Seoul (KR); Se-hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 11/727,252

(22) Filed: Mar. 26, 2007

(65) Prior Publication Data

US 2007/0250607 A1 Oct. 25, 2007

Related U.S. Application Data

(60) Provisional application No. 60/792,974, filed on Apr. 19, 2006.

(30) Foreign Application Priority Data

Nov. 29, 2006 (KR) .......................... 10-2006-0119306

(51) Int. Cl.
*G06F 15/16* (2006.01)
(52) U.S. Cl.
USPC ............................ 709/248; 709/203; 709/230
(58) Field of Classification Search
USPC .......................................... 709/203, 230, 248
See application file for complete search history.

(56) References Cited

U.S. PATENT DOCUMENTS

| 7,685,288 | B2* | 3/2010 | Kakivaya et al. | 709/227 |
|---|---|---|---|---|
| 7,689,713 | B2* | 3/2010 | Fornari | 709/238 |
| 2001/0028636 | A1* | 10/2001 | Skog et al. | 370/328 |
| 2003/0055961 | A1* | 3/2003 | Torii | 709/224 |
| 2003/0212826 | A1 | 11/2003 | Rapakko et al. | |

(Continued)

FOREIGN PATENT DOCUMENTS

| KR | 10 2003 0068237 A | 8/2003 |
|---|---|---|
| KR | 10 2005 0096077 A | 10/2005 |

OTHER PUBLICATIONS author unknown, SyncML Sync Protocol, version 1.1, Feb. 2002, pp. 1 ,2, 8 of 62 pages, retrieved from http://www.openmobilealliance. com/ at /docs/syncml_sync_protocol_v11_20020215.pdf.*

(Continued)

*Primary Examiner* — Patrice Winder
(74) *Attorney, Agent, or Firm* — Sughrue Mion, PLLC

(57) ABSTRACT

An apparatus, system and method for executing discovery in a network are provided. The system for executing discovery in a network is configured with a SyncML server and a SyncML client, and includes a SyncML server that transmits a multicast search message to the SyncML client in order to search for a SyncML client that exists in a network, and executes a data synchronization with the found SyncML client, and a SyncML client that transmits a notify-alive message to the SyncML server in order to notify that the SyncML client exists in a network, and executes a synchronization with the SyncML server.

15 Claims, 6 Drawing Sheets

(56) References Cited

U.S. PATENT DOCUMENTS

| | | | |
|---|---|---|---|
| 2003/0217181 A1* | 11/2003 | Kiiskinen | 709/248 |
| 2004/0075675 A1 | 4/2004 | Raivisto et al. | |
| 2004/0139180 A1* | 7/2004 | White et al. | 709/221 |
| 2004/0205263 A1 | 10/2004 | Sivaraman et al. | |
| 2005/0055352 A1* | 3/2005 | White et al. | 707/10 |
| 2005/0125459 A1 | 6/2005 | Sutinen et al. | |
| 2005/0165947 A1 | 7/2005 | Auriemma et al. | |
| 2005/0258806 A1 | 11/2005 | Janik et al. | |

OTHER PUBLICATIONS

Lee, Byung-Yun et al.; "Data synchronization protocol in mobile computing environment using SyncML," High speed networks and multimedia communications 5th IEEE International Conference on Jul. 3-5, 2002, pp. 133-137.

\* cited by examiner

FIG. 4

```
:
<device>                        410                           420
    <deviceType>
        urn:schemas-oma-org:device: DiscoverableSyncMLServer:1
                            <or>
        urn:schemas-oma-org:device: DiscoverableSyncMLClient:1
    </deviceType>
    <friendlyName>SyncML Server1</friendlyName>
    <manufacturer>SEC</manufacturer>
    <manufacturerURL>http://sync.samsung.com</manufacturerURL>
    <modelDescription>SyncML Device with embedding the Discovery Agent</modelDescription>
    <modelName>SMLP-1234</modelName>
    <modelNumber>20061234</modelNumber>
    <modelURL>192.168.100.23</modelURL>
    <UDN>uuid:B33E4B80-4132-4ec2-8129-99D0C6F854BE</UDN>
    <iconList>
        <icon>
            <mimetype>image/png</mimetype>
            <width>256</width>
            <height>356</height>
            <depth>32</depth>
            <url>/icon.png</url>
        </icon>
    </iconList>
    <presentationURL>192.168.100.23/presentation.html</presentationURL>
</device>:
:
```

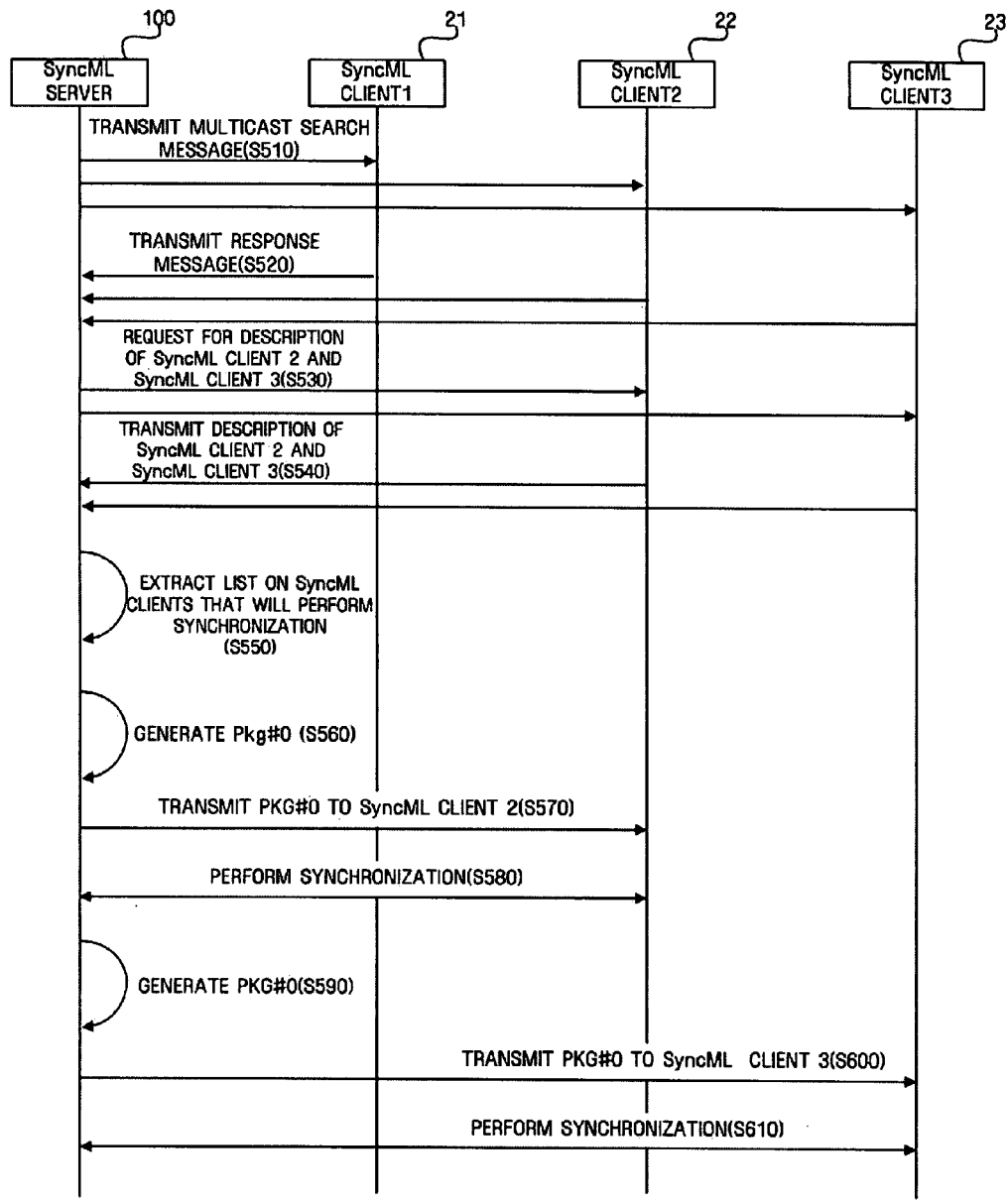

US 8,521,911 B2

APPARATUS, SYSTEM AND METHOD FOR EXECUTING DISCOVERY IN NETWORK

CROSS-REFERENCE TO RELATED APPLICATION

This application claims priority from Korean Patent Application No. 10-2006-0119306 filed on Nov. 29, 2006 in the Korean Intellectual Property Office, and U.S. Provisional Patent Application No. 60/792,974 filed on Apr. 19, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to an apparatus, system and method for executing discovery in a network, and more particularly to an apparatus and method for searching for a specific device via a discovery process, and notifying the existence of a client in a SyncML-based device.

2. Description of the Related Art

Generally, Universal Service Bus (USB), using an additional cable and protocol (e.g., Universal Plug and Play (UPnP)) including a discovery method, does not need an additional discovery mechanism for synchronizing the transmission of data between devices. When the discovery process is applied to synchronization markup language (SyncML) devices, manufacturers have the burden of licensing costs and increases in development costs. The SyncML protocol was introduced as a standard for data synchronization between mobile devices manufacturers.

FIG. 1 depicts a synchronization process in a general SyncML-based device.

If a SyncML-based device performs synchronization by exchanging data, which is managed by applications, located on a specific position, to-be-synchronized devices are divided into a SyncML server and SyncML client.

In SyncML, the synchronization is started when the SyncML server transmits Pkg. #0 having an alert package to the SyncML client. Alternatively, when the SyncML client sends a request for synchronization to the SyncML server, the SyncML client transmits a synchronization-requesting message corresponding to Pkg. #1 to the SyncML server.

Accordingly, before synchronization, the SyncML server and the SyncML client should search for the to-be-synchronized SyncML client in order to determine whether the SyncML client is available.

For example, an additional device-discovery method should be used for the device discovery between the SyncML server and the SyncML client in an environment where it is possible to change an Internet Protocol (IP) such as Dynamic Host Configuration Protocol (DHCP) or Auto-IP allocated when a device is connected to a network.

When the synchronization starts, an initialization package, i.e., Pkg. #1 and Pkg. #2, is transmitted to the SyncML server and the SyncML client, and data to be synchronized is exchanged via Pkg. #3 and Pkg. #4. The SyncML client then updates the data and transmits a result of the synchronization to the SyncML server via Pkg. #5. After checking the transmitted result, the SyncML server transmits a final acknowledgement, i.e., Pkg. #6, which ends the synchronization.

If IPs of the SyncML server and the SyncML client are changed, there is a problem in that device information required for the synchronization would have to be updated by an additional method. That is, a user has to discover devices before the synchronization.

To synchronize devices such as mobile devices that are connected to a specific network or removed from the network, a user would have to determine whether each device exists, and obtain device information such as an IP address, which is inconvenient.

When the SyncML client wants to synchronize with the SyncML server, the SyncML client cannot know the time when the SyncML server is connected to the network. Therefore, the SyncML client should check whether the SyncML server is connected to the network by periodically polling the SyncML server, or using a device discovery method. Accordingly, the SyncML client would not know whether the SyncML server exists without performing an additional search before Pkg. #0, i.e., the alert package, is transmitted from the SyncML server.

Therefore, a discovery method that can be applied to devices having SyncML based-synchronization mechanism is required to be developed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above In view of the above, it is an aspect of the present invention to search for a specific SyncML device among apparatuses for a synchronization based on SyncML, and notify that existence of a SyncML client to other SyncML devices.

This and other aspects of the present invention will become clear to those skilled in the art upon review of the following description, attached drawings and appended claims.

The present invention provides a server for executing discovery in a network, the server including a SyncML server that embodies a data-synchronization protocol for synchronizing predetermined data, a SyncML server agent that communicates a data synchronization with a SyncML client application, and a discovery agent that searches for a SyncML client to be synchronized before the data synchronization is executed.

According to an aspect of the present invention, there is provided a client for executing discovery in a network, the client including a SyncML client agent that communicates data synchronization with a SyncML server application and a discovery agent that searches for the SyncML server in order to execute the data synchronization with the SyncML server.

According to another aspect of the present invention, there is provided a system for executing discovery in a network corresponding to a system configured with a SyncML server and a SyncML client, the system including a SyncML server that transmits a multicast search message to the SyncML client in order to search for a SyncML client that exists in a network, and executes a data synchronization with the found SyncML client, and a SyncML client that transmits a notify-alive message to the SyncML server in order to notify that a SyncML client exists in a network, and executes a synchronization with the SyncML server.

According to another aspect of the present invention, there is provided a method of executing discovery in a network, the method including searching for a SyncML client that exists in the network by transmitting a multicast search message, requesting for description from the found SyncML client, extracting a SyncML client to be synchronized based on the description received in response to the request, and executing a synchronization with the extracted SyncML client.

According to another aspect of the present invention, there is provided a method of executing discovery in a network, the method including notifying that a SyncML client exists in the network by transmitting a notify-alive message to the SyncML server, transmitting a description to the SyncML server, and executing synchronization with the SyncML server.

BRIEF DESCRIPTION OF THE DRAWINGS

The above and other aspects of the present invention will become apparent by describing in detail preferred embodiments thereof with reference to the attached drawings in which:

FIG. 4 shows description information of an apparatus for executing discovery in a network according to an exemplary embodiment of the present invention;

FIG. 5 is a flowchart showing a SyncML server executing discovery and synchronization with SyncML clients using discovery methods in a network according to an exemplary embodiment of the present invention;

DETAILED DESCRIPTION OF EXEMPLARY EMBODIMENTS OF THE INVENTION

Figure 1:
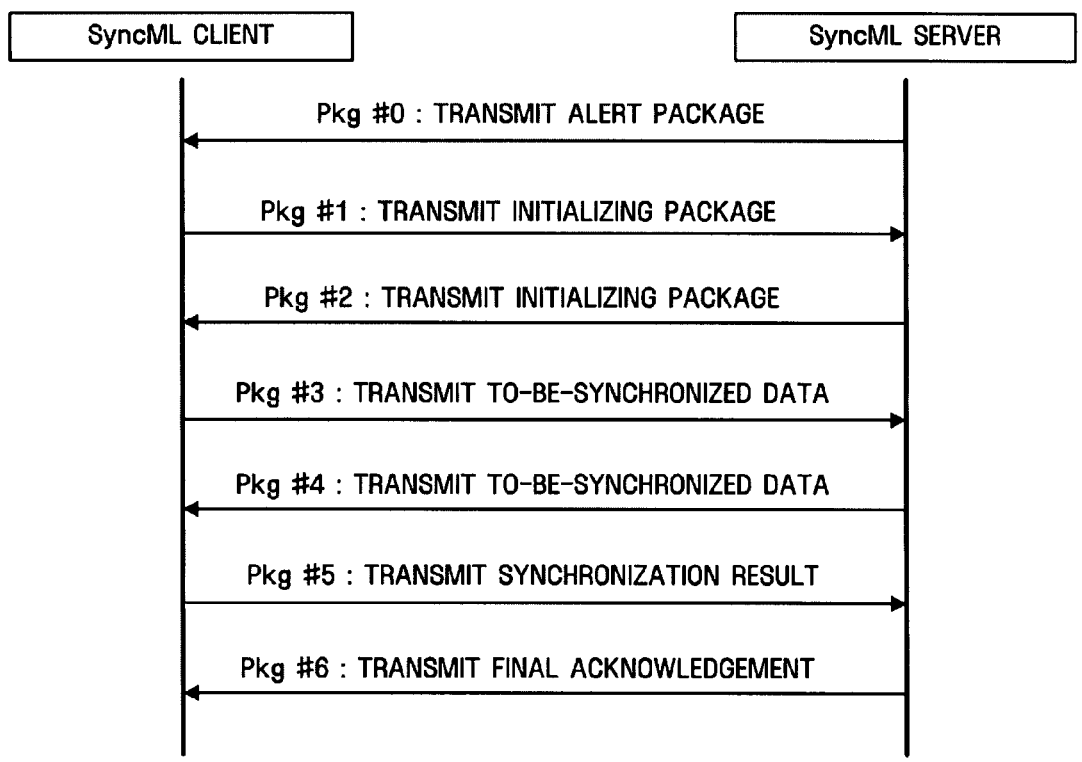
FIG. 1 depicts a process of executing synchronization in a general SyncML based-device.

Exemplary embodiments of the present invention will be described in detail with reference to the accompanying drawings.

Aspects of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 2:
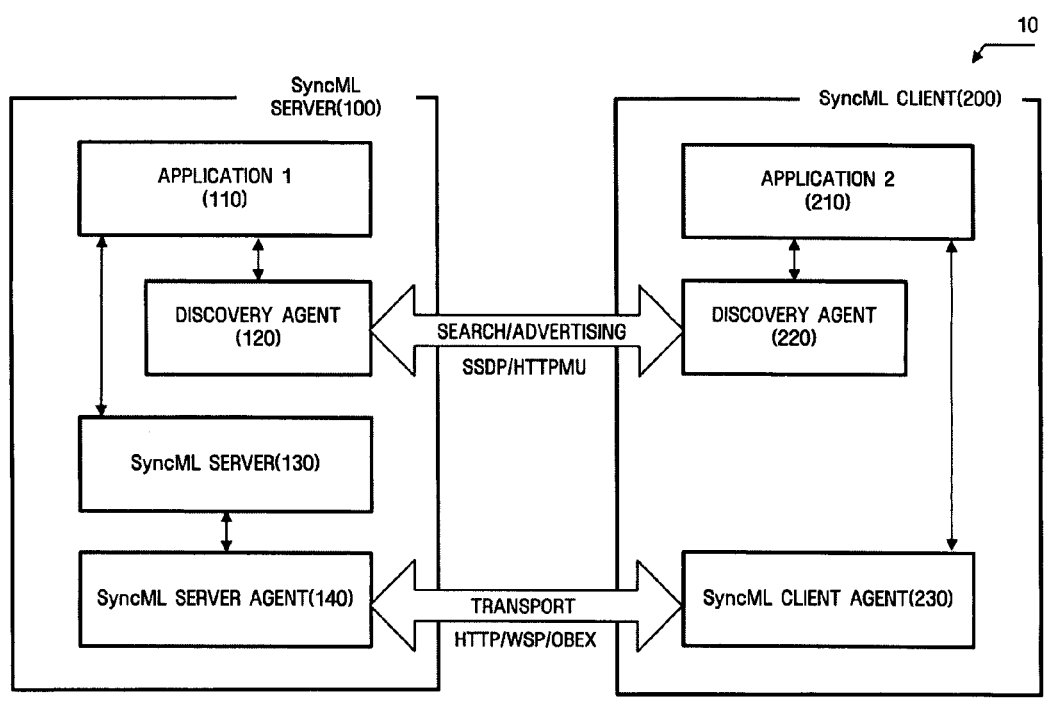
FIG. 2 is a view showing a system for executing discovery in a network according to an exemplary embodiment of the present invention.

FIG. 2 is a view showing a system for executing discovery in a network according to an exemplary embodiment of the present invention.

As shown in FIG. 2, a discovery-executing system 10 includes a SyncML server 100 and a SyncML client 200.

When a SyncML-based device performs synchronization by exchanging data, which is managed by applications, located at a specific position, to-be-synchronized devices are divided between the SyncML server 100 and SyncML client 200. The SyncML server 100 includes an application 1 110, a discovery agent 120, a SyncML server 130, and a SyncML server agent 140. The SyncML client 200 includes an application 2 210, a discovery agent 220, and SyncML client agent 230.

The applications 110 and 210 are services for providing data synchronization, which are connected via a network transport such as HTTP, WSP, and OBEX. SyncML server 130 is the data-synchronization protocol. The SyncML server agent 140 manages the SyncML server 130 accessing the network, and performs data synchronization with a client application. The client agent 230 enables the application 2 210 to be connected to the network.

Protocols such as Simple Service Discovery Protocol (SSDP) and Hypertext Transport Protocol Multicast (HTPMU) are used to search for a device that exists in the network. The discovery agents 120 and 220 search for a specific SyncML device, and transmit a message to notify its existence to other SyncML devices. Here, SSDP can be divided into multicast search message (M-search message) used to search for a desired SyncML client 200 by the SyncML server 100 and a notify-alive message used by the SyncML client 200 to notify its state, i.e., advertising.

Figure 3:
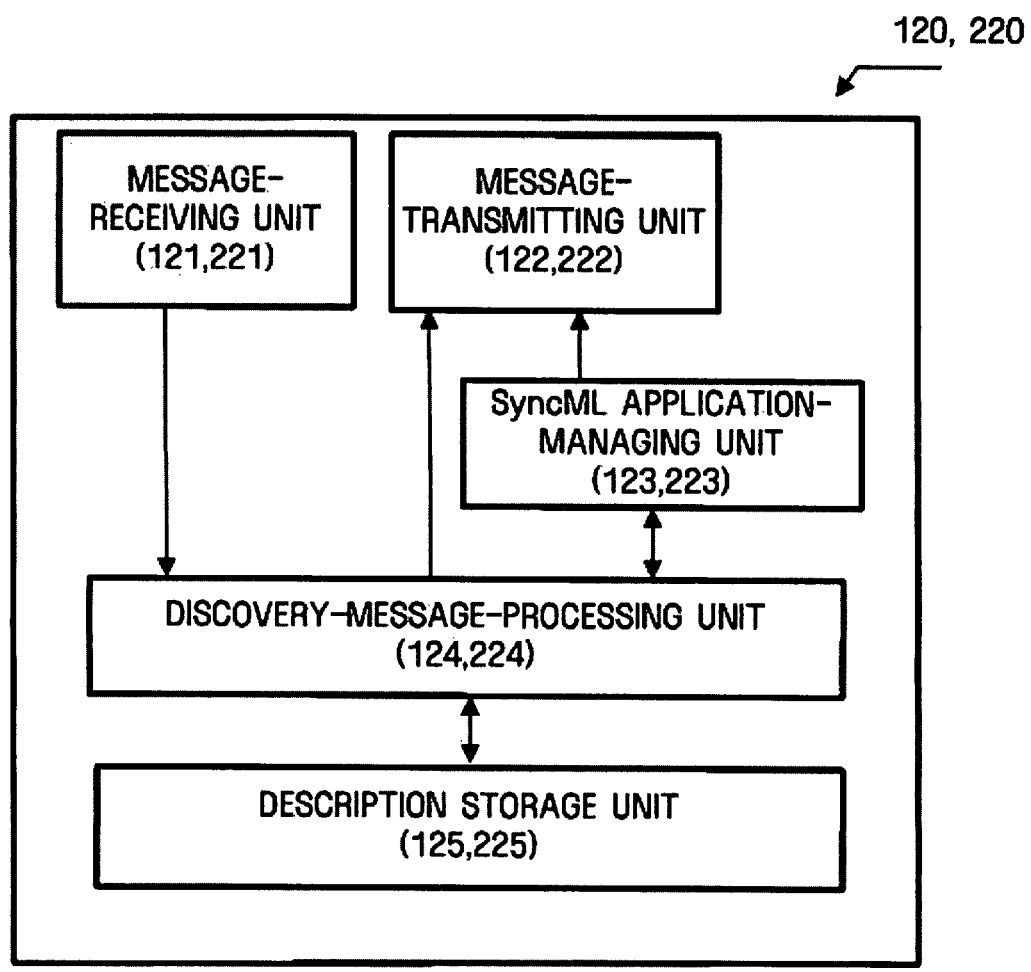
FIG. 3 is a detailed block diagram showing a discovery agent of an apparatus for executing discovery in a network according to an exemplary embodiment of the present invention.

FIG. 3 is a detailed block diagram showing a discovery agent of an apparatus for executing discovery in a network according to an exemplary embodiment of the present invention. The discovery agent exists in the SyncML server 100 and the SyncML client 200.

The discovery agent 120 included in the SyncML server 100 will be described in the following.

As shown in FIG. 3, the discovery agent 120 includes a message-receiving unit 121, a message-transmitting unit 122, a SyncML-application-managing unit 123, a discovery-message-processing unit 124, and a description storage unit 125.

The message-receiving unit 121 receives the multicast message, or transmits a unicast message to the discovery-message-processing unit 124.

The message-transmitting unit 122 transmits the multicast message to the network, or a user datagram protocol (UDP) response message generated by the discovery-message-processing unit 124 to a specific SyncML client.

The SyncML-application-managing unit 123 used to communicate with the SyncML application provides information that the application requests from the discovery agent 120 to the application by forwarding the information to the discovery-message-processing unit 124 and extracting the desired information from the description storage unit 125.

The SyncML-application-managing unit 123 transmits a search message to other SyncML devices via the message-transmitting unit 122 based on a description extracted by the discovery-message-processing unit 124.

The discovery-message-processing unit 124 that manages information of the description storage unit 125 stores a device description received from the message-receiving unit 121 in the description storage unit 125, or erases a specific description stored in the description storage unit 125.

The discovery-message-processing unit 124 extracts and provides the device description requested by the SyncML-application-managing unit 123, or processes a request for erasing the description.

The description storage unit 125 stores the descriptions of other SyncML devices collected by the discovery agent 120 as well as its own device description. The description storage unit 125 can be embodied by a storage such as a DB or a file system.

The discovery agent 220 included in the SyncML client 200 will be described in the following.

As shown in FIG. 3, the discovery agent 220 includes a message-receiving unit 221, a message-transmitting unit 222, a SyncML-application-managing unit 223, a discovery-message-processing unit 224, and a storage unit 225.

The message-receiving unit 221, the message-transmitting unit 222, the discovery-message-processing unit 224, and the storage unit 225 are the same as the message-receiving unit 121, the message-transmitting unit 122, the discovery-message-processing unit 124, and the storage unit 125 included in the SyncML server 100 and a detailed explanation thereof has been omitted.

The SyncML-application-managing unit 223 used to communicate with the SyncML application provides information that the application requests from the discovery agent 220 to the application by forwarding the information to the discovery-message-processing unit 224 and extracting the desired information from the description storage unit 225.

The SyncML-application-managing unit 223 transmits an advertising message to other SyncML devices via the message-transmitting unit 222 based on a description extracted by the discovery-message-processing unit 224.

The term "unit", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

FIG. 4 shows description information of an apparatus for executing discovery in a network according to an exemplary embodiment of the present invention.

As shown in FIG. 4, the SyncML client that has an XML description in the description storage unit 225 notifies its existence to other SyncML devices located in the network via a notify-alive message, or, when the description is requested, extracts the stored description in order to transmit the description to the network.

Also, the SyncML server 100 can check if the SyncML client can be synchronized, and select a specific SyncML client that requires synchronization by including standardization group information 410 and device version information 420 in <device type> of the description.

FIG. 5 is a flowchart showing a SyncML server executing discovery and synchronization with SyncML clients using methods of executing discovery in a network according to an exemplary embodiment of the present invention. Here, it is assumed that a single SyncML server 100 and a plurality of SyncML clients 1, 2, and 3 (21, 22, and 23) exist in the network. The SyncML server 100 searches for the SyncML clients that exist in the network, which is illustrated in FIG. 5.

The SyncML server 100 transmits a multicast search message to the network via the message-transmitting unit 122 S510. All receivable SyncML clients 21, 22, and 23 generate a response message for the multicast search message, and respond S520.

Then, the SyncML server 100 receives a response message via the message-receiving unit 121, and requests a description from the SyncML client 2 (22) and the SyncML client 3 (23) S530. The SyncML application-managing unit 223 of client 2 (22) and client 3 (23) extracts and transmits its description information upon the request of the SyncML server 100 S540. The SyncML server 100 can know that the SyncML client is synchronized based on the description information of the transmitted SyncML clients 22 and 23, and select the SyncML client that requires synchronization based on the description information. The SyncML server 100 can select one or more SyncML clients that require synchronization.

The discovery-message-processing unit 124 of the SyncML server 100 stores the transmitted description information in the description storage unit 125. The SyncML server 100 extracts a list of the SyncML clients that will perform synchronization based on the stored description information S550. Then, the SyncML server 100 selects a SyncML client that will perform synchronization for the first time based on the extracted list.

The SyncML server 100 generates Pkg. #0 (an alert package) for the selected SyncML client 2 (22) S560, and transmits the generated Pkg. #0 to the SyncML client 2 (22) S570. Then, the SyncML server 100 and the SyncML client 2 (22) perform the synchronization by exchanging the to-be-synchronized data S580.

After the data is synchronized with the SyncML client 2 (22), the SyncML server 100 selects a SyncML client that will perform synchronization for the second time based on the extracted list, generates Pkg. #0 for the selected SyncML client 3 (23) S590, and transmits the generated Pkg. #0 to the SyncML client 3 (23) S600. Then, the SyncML server 100 and the SyncML client 3 (23) perform the synchronization by exchanging the to-be-synchronized data S610.

Figure 6:
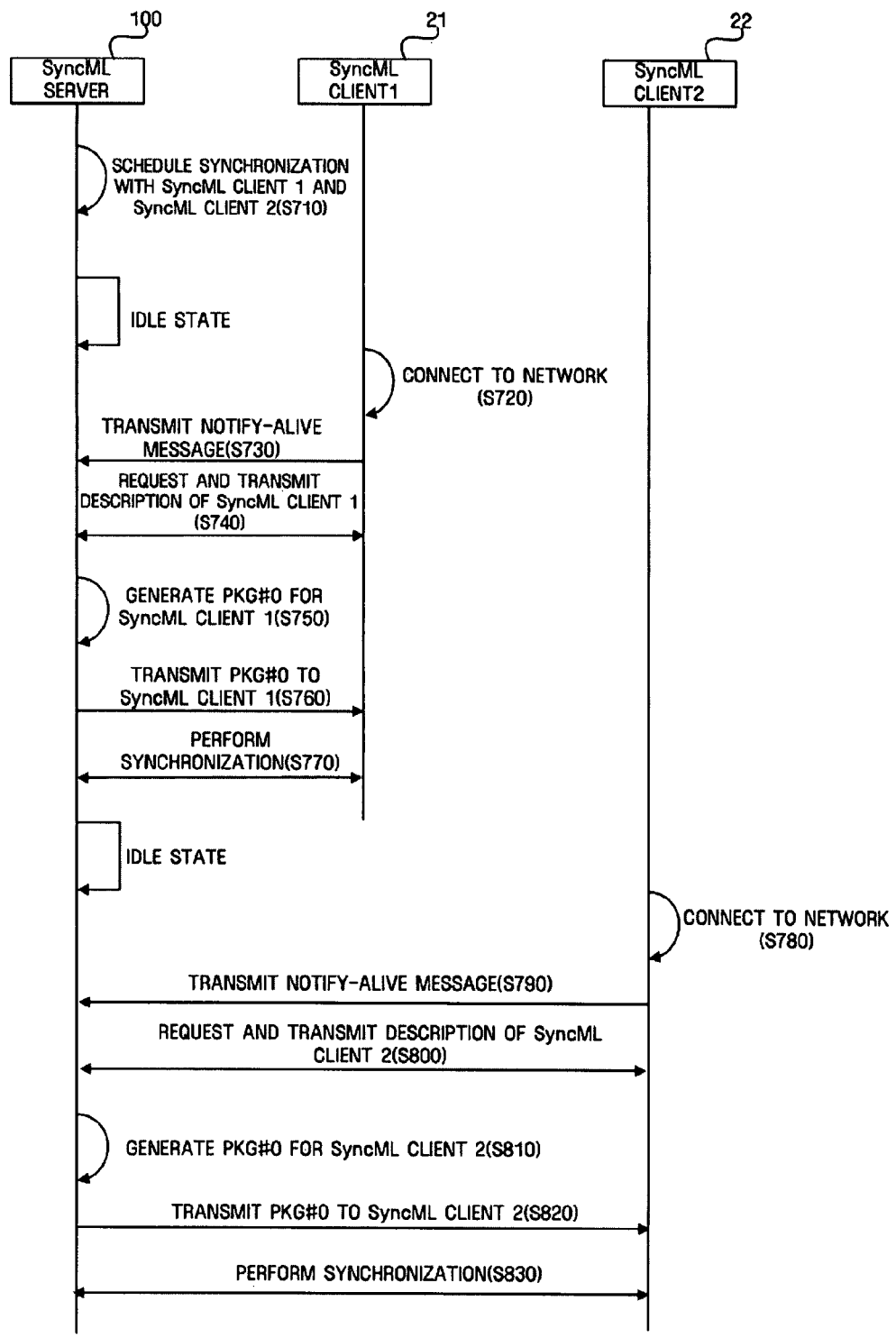
FIG. 6 is a flowchart showing, when a SyncML client is connected, a process of executing discovery and synchronization with a SyncML server using discovery methods in a network according to an exemplary embodiment of the present invention.

FIG. 6 is a flowchart showing, when a SyncML client is connected, a process of executing discovery and synchronization with a SyncML server using discovery methods in a network according to an exemplary embodiment of the present invention. Here, it is assumed that a single SyncML server 100 and a plurality of SyncML clients 1 and 2 (21 and 22) exist in the network. The SyncML client that connects to the network notifies its existence to the SyncML server 100, which is illustrated in FIG. 6.

After completing scheduling for the SyncML clients 1 and 2 that require synchronization, the SyncML server 100 remains in an idle state S710. The SyncML client 1 connects to the network, and transmits a notify-alive message to the SyncML server 100 S720 and S730.

The SyncML server 100 receives the notify-alive message transmitted from the SyncML client 1 via the message-receiving unit 121. Here, the SyncML server can know that SyncML client 1 is available in the network via the notify-alive message.

The SyncML server 100 then requests a description of SyncML client 1 from the SyncML client 1. The SyncML application-managing unit 223 of the SyncML client 1 extracts its description information from the description storage unit 225 upon the SyncML server's request, and transmits the information to the SyncML server S740.

The discovery-message-processing unit 124 of the SyncML server 100 stores the transmitted description information in the description storage unit 125, and generates Pkg. #0 for the SyncML client 1 S750.

The discovery-message-processing unit 124 transmits the generated Pkg. #0 to the SyncML client 1 S760. The SyncML server 100 and the SyncML client 1 perform the synchronization by exchanging the to-be-synchronized data S770.

Then, the SyncML server 100 remains in an idle state until the SyncML client 2 sends a notify-alive message.

When the SyncML client 2 connects to the network, and transmits the notify-alive message to the SyncML server 100 S780, the SyncML server 100 receives the notify-alive message transmitted from the SyncML client 2 via the message-receiving unit 121. Here, the SyncML server 100 can know that the SyncML client 2 is available in the network via the notify-alive message.

The SyncML server 100 then requests a description of the SyncML client 2 from the SyncML client 2. The SyncML application-managing unit 223 of the SyncML client 2 extracts its description information from the description storage unit 225 upon the SyncML server's request, and transmits the information to the SyncML server S800.

The discovery-message-processing unit 124 of the SyncML server 100 stores the transmitted description information in the description storage unit 125, and generates Pkg. #0 for the SyncML client 2 S810.

The discovery-message-processing unit 124 transmits the generated Pkg. #0 to the SyncML client 2 S820. The SyncML server 100 and the SyncML client 2 perform the synchronization by exchanging the to-be-synchronized data S830.

As described above, the apparatus, system, and method for executing discovery in the network according to the exemplary embodiments of the present invention produces one or more of the effects described below.

When devices that synchronize data based on SyncML discovery of other devices, it is possible to maximize the efficiency of the synchronization procedure without requiring user feedback.

Even if an IP of a device connected to a specific network for synchronization is changed, it is possible to discover a device through a discovery process between devices without requiring user feedback.

The SyncML client can more quickly recognize the existence of the SyncML server, thereby performing a request for synchronization without a message (Pkg. #0) being sent to the SyncML server.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A server for executing discovery in a network, the server comprising:
    a SyncML server which comprises a data-synchronizing protocol for synchronizing predetermined data;
    a SyncML server agent which communicates with a SyncML client application for data synchronization; and
    a discovery agent which searches for a SyncML client to be synchronized before the data synchronization is executed,
    wherein the discovery agent searches for a SyncML client that exists in the network by transmitting a multicast search message, and
    wherein the discovery agent extracts a list of SyncML clients to be synchronized based on description information received from the searched SyncML client, and selects a SyncML client to be synchronized based on the extracted list.

2. The server of claim 1, wherein the discovery agent comprises:
    a message-receiving unit which receives a notify-alive message transmitted from the SyncML client and a description of the SyncML client;
    a message-transmitting unit which transmits the multicast search message to the SyncML client;
    a SyncML application-managing unit which provides the received SyncML client description to an application; and
    a description storage unit which stores the description transmitted from the SyncML client.

3. The server of claim 2, wherein the description has synchronization information.

4. A client for executing discovery in a network, the client comprising:
    a SyncML client agent which performs data synchronization with a SyncML server application; and
    a discovery agent which searches for a SyncML server in order to execute the data synchronization with the SyncML server,
    wherein the discovery agent searches for the SyncML server by notifying that a SyncML client exists in the network by transmitting a notify-alive message to the SyncML server, and
    wherein the discovery agent transmits a notify-alive message to the SyncML server after completing scheduling for SyncML clients that require synchronization.

5. The client of claim 4, wherein the discovery agent comprises:
    a message-receiving unit which receives a multicast search message transmitted from the SyncML server and a description-requesting message;
    a message-transmitting unit which transmits the notify-alive message to the SyncML server;
    a SyncML application-managing unit which extracts a description of the client upon request, and provides the description to an application; and
    a description storage unit which stores the description of the client.

6. The client of claim 5, wherein the description has synchronization information.

7. A system for executing discovery in a network, the system comprising:
    a SyncML server which transmits a multicast search message to a first SyncML client in order to search for a second SyncML client that exists in the network, and executes a data synchronization with the second SyncML client; and
    wherein the first SyncML client transmits a notify-alive message to the SyncML server in order to notify the SyncML server that the second SyncML client exists in the network, and executes the data synchronization with the SyncML server.

8. The system of claim 7, wherein the SyncML server comprises:
    a message-receiving unit which receives a notify-alive message transmitted from the first SyncML client and a description of the first SyncML client;
    a message-transmitting unit which transmits a multicast search message to the first SyncML client;
    a SyncML application-managing unit which provides the received first SyncML client description to an application; and
    a description storage unit which stores the description of the first SyncML client transmitted from the first SyncML client.

9. The system of claim 8, wherein the description has synchronization information.

10. The system of claim 7, wherein the first SyncML client comprises:

a message-receiving unit which receives the multicast search message transmitted from the SyncML server and a description-requesting message;

a message-transmitting unit which transmits the notify-alive message to the SyncML server;

a SyncML application-managing unit which extracts a description of the first SyncML client upon request, and provides the description to an application; and a description storage unit which stores the description of the first SyncML client.

11. A method of executing discovery in a network and synchronizing a SyncML client, the method comprising:

searching for a SyncML client that exists in the network by transmitting a multicast search message;

requesting a description from a discovered SyncML client;

extracting information on the discovered SyncML client to be synchronized from a received description; and executing a synchronization with the discovered SyncML client wherein a list of SyncML clients to be synchronized is extracted based on the received description, and a SyncML client to be synchronized is selected based on the extracted list.

12. The method of claim 11, wherein the description has synchronization information.

13. A method of executing discovery in a network by notifying the existence of a SyncML client to a SyncML server, the method comprising:

notifying that the SyncML client exists in the network by transmitting a notify-alive message to the SyncML server;

transmitting a description to the SyncML server; and executing a synchronization with the SyncML server, wherein the notify-alive message is transmitted to the SyncML server after completing scheduling for SyncML clients that require synchronization.

14. The method of claim 13, wherein the description has synchronization information.

15. The server of claim 1, wherein a list of SyncML clients that will perform synchronization is generated based on stored description information, and a SyncML client that will perform synchronization is selected based on the generated list.

* * * * *